United States Patent
Trudeau

[15] 3,665,704
[45] May 30, 1972

[54] DRAG CHAIN

[72] Inventor: Francis E. Trudeau, Chicago Heights, Ill.
[73] Assignee: Portec, Inc., Chicago, Ill.
[22] Filed: June 16, 1969
[21] Appl. No.: 833,536

[52] U.S. Cl. ..................................59/85, 74/254, 198/189
[51] Int. Cl. ..............................................F16g 13/06
[58] Field of Search...........................59/85, 78, 80, 82, 8, 5; 74/254, 249; 198/189

[56] References Cited

UNITED STATES PATENTS

| 743,070 | 11/1903 | Garland | 198/189 |
| 758,913 | 5/1904 | Hampton | 74/254 |
| 1,568,116 | 1/1926 | Webb | 74/254 |
| 1,808,236 | 6/1931 | Lerner | 74/254 |
| 3,334,726 | 8/1967 | Fredrikson | 74/254 |

FOREIGN PATENTS OR APPLICATIONS

| 33,588 | 8/1924 | Denmark | 59/78 |

Primary Examiner—Charles W. Lanham
Assistant Examiner—Gene P. Crosby
Attorney—Emory L. Groff and Emory L. Groff, Jr.

[57] ABSTRACT

A drag chain having a plurality of similar links pivotally connected by a lock pin joining the spaced apart side arms of one link to the cross bar of the next link. Retention of the positioned lock pin is assured by keeper heads at the ends of the side arms, shiftable from an access to a closed position.

5 Claims, 6 Drawing Figures

Patented May 30, 1972
3,665,704
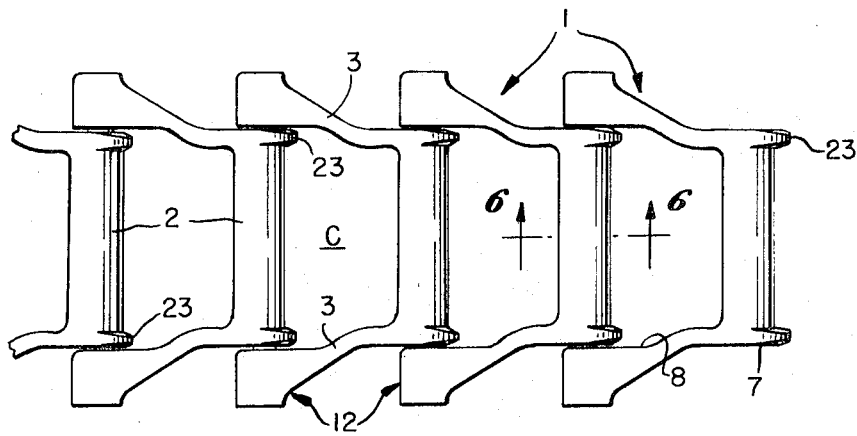
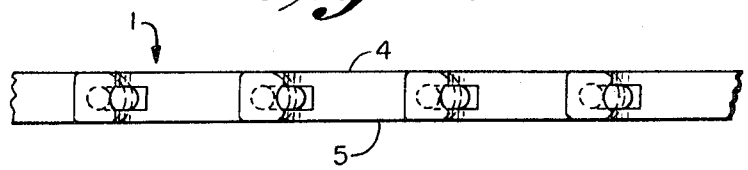
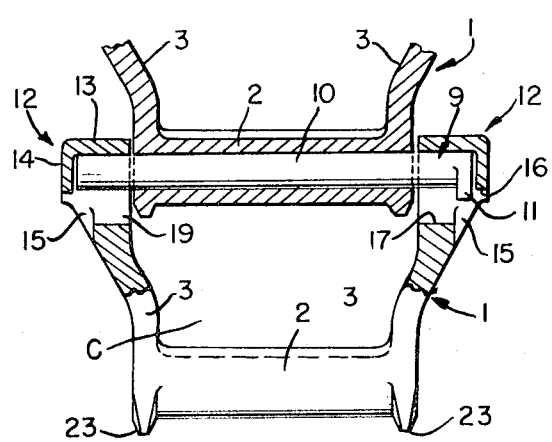
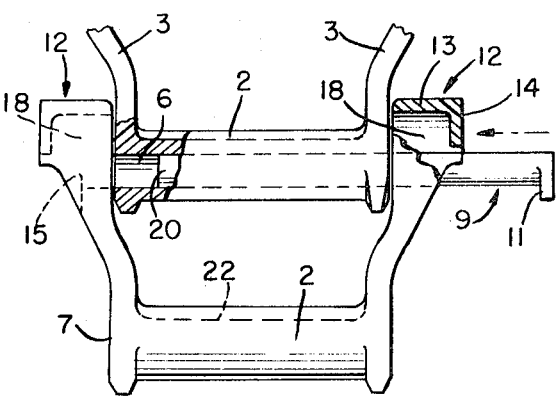
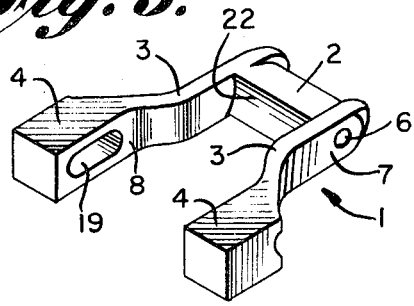
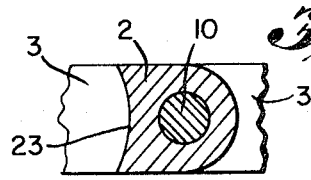
INVENTOR
FRANCIS E. TRUDEAU
BY
ATTORNEYS

DRAG CHAIN

This invention relates generally to chain, and more particularly to a drag chain comprising a plurality of similarly constructed links joined together in longitudinal alignment by means of integral lock pins without additional fastening members.

Although particularly suitable for use as a conveyor or drag chain, it will be appreciated that the link of the instant invention may be applied in numerous endless chain installations requiring a plurality of pivotally connected links each including a cross bar and a pair of side arms. Many prior chain links have been known comprising a plurality of intricate components which obviously would require a great deal of labor to assemble or to subsequently replace damaged links. The most prevalent means for retaining many of these chain assemblies has comprised a lock pin which is secured in position by means of various types of fasteners such as nuts or cotter pins. It will be appreciated that the installation and replacement of these fasteners is a time-consuming operation considering that a single endless chain assembly may include several hundred link subassemblies and attendant lock pins. Furthermore, during operation of the chain, particularly as a drag chain, the resultant abrasion between the moving components of the chain and the surrounding environment, which may comprise a highly abrasive bulk material being conveyed, it will follow that the use of fastening devices as mentioned hereinbefore would create a high wear rate thus necessitating frequent replacement of components of the chain.

The drag chain of the present invention, on the other hand, includes a single unitary link which may be rapidly connected to additional links of similar construction by means of an integral L-head lock pn without the necessity of utilizing any special tools or additional fastening members. Following the interlocking of two adjacent links by means of the present lock pin the mere longitudinal displacement of one of the links being joined serves to encapsulate both ends of the lock pin within a protective keeper head at the two ends of the link side arms, which heads serve not only to exclude both ends of the lock pin from contact with any material being conveyed but also positively lock the connecting pin against longitudinal displacement while permitting free pivoting between the two connected links.

Accordingly, one of the objects of the present invention is to provide an improved drag chain including a plurality of substantially U-shaped integral links joined one to another by means of an integral lock pin, both ends of which are automatically entrapped by the ends of each link following the assembly of each pair of links.

Another object of the present invention is to provide an improved drag chain including a plurality of integral links each having a pair of side arms connected at one end by a cross bar and including a keeper head at the free end of each side arm.

A further object of the present invention is to provide a drag chain link including a cross bar having a pair of diverging side arms extending therefrom wherein the distal portion of each side arm includes an elongated opening on the inner face thereof and a restricted access opening on the outer face thereof.

Still another object of the present invention is to provide a drag chain including a plurality of links each including a cross bar having a pair of diverging side arms extending therefrom to define a conveying chamber therebetween, and the forward surface of the cross bar constructed with a concave wall.

With these and further objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawing, in which:

FIG. 1 is a partial top plan view of the improved drag chain of the present invention.

FIG. 2 is a side elevation of the drag chain shown in FIG. 1.

FIG. 3 is an enlarged fragmentary top plan view, partly in section, and illustrates a pair of the links of the present drag chain in the assembled position.

FIG. 4 is a view similar to FIG. 3 and illustrates a pair of links during assembly of the lock pin.

FIG. 5 is a perspective view of the link of the improved drag chain of the present invention.

FIG. 6 is a transverse sectional view taken along the line 6—6 of FIG. 1.

Similar reference characters designate corresponding parts throughout the several figures of the drawing.

Referring now to the drawing, more particularly FIG. 1, the present invention will be seen to comprise a plurality of links, each generally designated 1, which are adapted to be assembled in the longitudinally aligned manner shown to provide an ultimate assembly providing an endless chain. The use of the disclosed drag chain will be well known to those skilled in the art, it being understood that suitable means (not shown) are provided for driving the endless chain in a longitudinal direction. When used as a conveyor or drag chain it will follow that bulk material which is picked up or delivered to the confined area C defining a conveying chamber within the links will be drawn longitudinally along with the chain links as the chain is driven, thus conveying a measured amount of material along with the chain links to the selected point of discharge.

The general construction of each link 1 will be apparent from a review of FIGS. 3–5 wherein it will be seen that the link includes a knuckle or cross bar 2 from which extend a pair of diverging side arms 3—3. The top and bottom of each link is defined by a top wall 4 and bottom wall 5, respectively, each of which comprises a planar surface formed by the two side arms 3 and the cross bar 2. This feature will be most readily apparent from FIGS. 2 and 5 of the drawing and is especially desirable considering the use of the instant drag chain wherein each link of the chain as it travels along the top flight of the conveyor frictionally engages a supporting surface of the conveyor, and in order to perform its conveying function it is necessary to provide a coplanar bearing surface to provide as effective a seal as possible with this conveying surface to preclude excessive leakage of the material being conveyed.

Extending longitudinally through each cross bar 2 is a cylindrical bore 6 which is bounded at both ends by a vertically extending planar outside bearing face 7—7. While the axis of the bore 6 extends transversely to the direction of travel of the chain, it will be understood that the outside bearing faces 7 are in a plane normal to the axis of the bore 6. By constructing each link with the side arms 3 in the divergent manner as shown it is possible to assemble a plurality of the U-shaped links 1 in series to provide the completed chain. In this respect it will be obvious that the distance between the two spaced apart outer ends of the side arms must be no less than the length of the cross bar 2 between the bearing faces 7—7. Inside bearing faces 8-8 are provided adjacent the ends of the side arms 3 at the point where the side arms of one link straddle the cross bar of the next adjacent link. These latter bearing faces 8-8 likewise define vertical planes extending transverse to the axis of the bore 6 and will be understood to be spaced apart a distance slightly greater than the distance between each pair of outside bearing faces 7—7, there being enough distance between the spacing of the two bearing faces to permit a smooth pivoting between the assembled links while at the same time precluding excessive side play between the links.

The cotterless connection of each pair of adjacent links 1 is achieved by means of an integral lock pin, generally designated 9, and comprising a cylindrical shank 10 with an offset or L-head 11 at one end thereof. The diameter of the shank 10 is selected to provide a smooth close fit within the bore 6 of the cross bar 2 while the length thereof will be seen to be substantially greater than the length of the cross bar 2. Each free end of the side arms 3 includes a keeper head 12 provided with a vertical front wall 13 and end wall 14 and an access opening 15 which latter is defined by the edge 16 of the end wall 14 and the forward side arm edge 17. The foregoing structure will be seen to define a pocket 18 which is fully enclosed except for the above described access opening 15 on the outside of the side arm 3 and an elongated opening 19 provided through the inside bearing face 8 from the front wall 13 rearwardly to the transverse side arm edge 17.

With the above structure in mind, the assembly and disassembly of the links of the present invention may now be described. Initially, a pair of links are positioned as shown in FIG. 4 with the inside bearing faces 8—8 of one link straddling the juxtaposed outside bearing faces 7—7 of a second link. To permit the insertion of the lock pin 9 there is another prerequisite, namely, that the transverse side arm edge 17 be aligned with the rearmost edge of the bore 6 as clearly shown in FIG. 4. In this manner it will be seen that the butt 20 of the lock pin 9 may be inserted through either one of the access openings 15, passed through the pocket 18 and may then exit therefrom through the rearmost portion of the elongated opening 19, and thence be moved through the bore 6 of the other link and into the opposite pocket 18 by way of the rear of the adjacent elongated opening 19. Following the foregoing manipulation, the two links in question are urged apart a slight distance and thus assume the position as shown in FIG. 3, which movement displaces the shank 10 of the lock pin 9 along the major axis of the elongated opening 19 and towards the front walls 18 of the two side arms 3—3. During this displacement, the offset head 11 of the lock pin which was heretofore disposed within the access opening 15, is positioned within the pocket 18 and bounded on the outside thereof by the juxtaposed end wall 14, while the opposite butt 20 of the lock pin shank 10 is similarly positioned juxtaposed the end wall 14 of the other pocket 18. From the foregoing arrangement, it will be seen that when in the assembled position of FIG. 3 the connected pair of links may be freely pivoted about the lock pin 9 while intended or accidental longitudinal displacement of the lock pin is prevented by the overlying end walls 14 of the two keeper heads 12.

When it becomes necessary to repair or replace one or more specific links 1 the subject links may be rapidly removed simply by providing enough slack in the chain to permit displacement of the lock pin shank 10 from the forward edge of the elongated openings 19 to the rearward edge thereof as shown in FIG. 4 whereby the lock pin 9 may be withdrawn in a manner reverse that described above with reference to the assembly of the links.

In addition to the conditions already described herein, two other requirements are necessary to insure operation of the present invention. The distance between the planes of the end wall edge 14 and transverse side arm edge 17 must be no less than the diameter of the lock pin shank 10, as will be apparent from FIG. 4, and also the thickness of the offset head 11 must not be greater than the distance between the plane of the inside surface of the end wall 14 and the outside of the side arm adjacent the edge 17. In this latter respect, the side arm 3 may be cut away as at 21 (FIGS. 2 and 3) to provide clearance for the squared end of the pin head 11.

Other features should be appreciated when considering the operation of the instant link as part of a drag chain. The efficiency of he chamber C to entrap and convey bulk material is materially improved by the provision of the concave wall 22 on the forwardly facing side of the cross bar 2.

Many of the present known chain assemblies comprise link subassemblies including a center link and a pair of separate spaced apart side bars. It is well known that during operation of these chain links by the conventional sprocket drive wheels a noticeable amount of lateral thrust is imparted to the side bars as the links pass around the sprocket teeth. By the provision of the rearwardly directed rims 23 at both ends of the cross bar 2 it will be seen that the sprocket teeth engaging the rounded driving side of the cross bar will be contained therebetween thus preventing contact with the adjacent side arms 3—3.

I claim:

1. A chain comprising a plurality of longitudinally aligned U-shaped links each including a transverse cross bar having a bore therethrough and a pair of side arms extending substantially longitudinally of the chain from opposite ends of the cross bar, a keeper head at the free end of each said side arm, an outside bearing face at each end of said cross bar, the opposed surfaces of said keeper heads each provided with an inside bearing face, the spacing therebetween permitting straddling of said outside bearing faces of the next adjacent link cross arm, each said keeper head including a pocket communicating with an elongated opening through said inside bearing face on the one hand and an access opening through the outer side of said side arm on the other hand, each said pocket defined by a front wall on the forward portion of each said keeper head and an end wall extending rearwardly from the outermost edge of each said front wall, each said access opening defined by a rearwardly facing edge on said end wall and an inwardly offset and forwardly facing edge on said side arm, said offset relationship providing a forwardly facing approach to said pocket through said access opening the axis of said approach which when extended is disposed substantially laterally away from each said link side arm and said cross bar, the longitudinal distance between said pair of edges of both said side arms being no less than the diameter of said pin shank, and a lock pin insertable first through one of said access openings thence through the bore of a next adjacent link and finally into the pocket of the opposite said keeper head through the elongated opening thereof, said lock pin including a cylindrical shank having a forward curved surface of a length sufficient to extend from within one said pocket to a point within the other said pocket of each said link, whereby subsequent longitudinal displacement of the two links joined by said lock pin moves said lock pin forwardly through said elongated openings to entrap both ends of said lock pin within said keeper head pockets to preclude axial displacement of said lock pin as said end walls mask the two ends of said pin and said forward curved surface of said lock pin engages the interior of both said keeper head front walls, and an offset head radially projecting from one distal portion of said lock pin shank.

2. A chain according to claim 1, wherein the surface of said cross arm facing rearwardly away from said side arms is convex and said side arms extend rearwardly beyond said convex surface to provide a pair of spaced apart rims.

3. A chain comprising a plurality of longitudinally aligned U-shaped links each including a transverse cross bar having a bore therethrough and a pair of side arms extending substantially longitudinally of the chain from opposite ends of the cross bar, said cross bar having a forwardly facing concave surface between said side arms, a keeper head at the free end of each said side arm, an outside bearing face at each end of said cross bar, the opposed surfaces of said keeper heads each provided with an inside bearing face, the spacing therebetween permitting straddling of said outside bearing faces of the next adjacent link cross arm, each said keeper head including a pocket communicating with an elongated opening through said inside bearing face on the one hand and an access opening through the outer side of said side arm on the other hand, each said pocket defined by a front wall on the forward portion of each said keeper head and an end wall extending rearwardly from the outermost edge of each said front wall, each said access opening defined by a rearwardly facing edge on said end wall and an inwardly offset and forwardly facing edge on said side arm, the longitudinal distance between said pair of edges of both said side arms being no less than the diameter of said pin shank, and a lock pin insertable first through one of said access openings thence through the bore of a next adjacent link and finally into the pocket of the opposite said keeper head through the elongated opening thereof, said lock pin including a cylindrical shank of a length sufficient to extend from within one said pocket to a point within the other said pocket of each link, whereby subsequent longitudinal displacement of the two links joined by said lock pin moves said lock pin forwardly through said elongated openings to entrap both ends of said lock pin within said keeper head pockets to preclude axial displacement of said lock pin as said end walls mask the two ends of said pin.

4. A chain according to claim 3, wherein said lock pin includes an offset head radially projecting from one distal portion of said shank.

5. A chain according to claim 1, wherein each said link is of symmetrical construction about a central longitudinal axis.

* * * * *